US011865890B2

(12) United States Patent
Yen et al.

(10) Patent No.: US 11,865,890 B2
(45) Date of Patent: Jan. 9, 2024

(54) ROCKING ARM STRUCTURE PROVIDING ADDITIONAL WHEEL SUPPORT AND DEVICE HAVING THE SAME

(71) Applicants: Futaijing Precision Electronics (Yantai) Co., Ltd., Yantai (CN); HON HAI PRECISION INDUSTRY CO., LTD., New Taipei (TW)

(72) Inventors: Sheng-Li Yen, New Taipei (TW); Chih-Cheng Lee, New Taipei (TW); Chen-Ting Kao, New Taipei (TW); Yu-Cheng Zhang, New Taipei (TW); Chiung-Hsiang Wu, New Taipei (TW); Chang-Ju Hsieh, New Taipei (TW); Chen Chao, New Taipei (TW); Yu-Sheng Chang, New Taipei (TW); Chi-Cheng Wen, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/084,101

(22) Filed: Dec. 19, 2022

(65) Prior Publication Data

US 2023/0202254 A1  Jun. 29, 2023

(30) Foreign Application Priority Data

Dec. 29, 2021  (CN) .......................... 202123369842.9

(51) Int. Cl.
*B60G 21/05*  (2006.01)
*B60G 7/00*  (2006.01)

(52) U.S. Cl.
CPC ............. *B60G 21/05* (2013.01); *B60G 7/001* (2013.01); *B60G 7/006* (2013.01)

(58) Field of Classification Search
CPC .......... B60G 3/14; B60G 21/05; B60G 7/001; B60G 7/006; B60G 2204/143
See application file for complete search history.

(56) References Cited

U.S. PATENT DOCUMENTS

| 4,565,390 A * | 1/1986 | Merkle .................... | B60G 9/00 |
| | | | 180/905 |
| 6,543,798 B2 * | 4/2003 | Schaffner ............. | A61G 5/1089 |
| | | | 280/755 |
| 10,603,119 B2 * | 3/2020 | Ross ...................... | A61B 50/13 |
| 2003/0159863 A1 * | 8/2003 | Hurlburt .................. | B60G 9/02 |
| | | | 180/24.12 |
| 2003/0205878 A1 * | 11/2003 | Martis ..................... | B60B 35/02 |
| | | | 280/124.111 |
| 2021/0323616 A1 * | 10/2021 | Fliearman ............... | B60B 37/10 |

* cited by examiner

*Primary Examiner* — Jason D Shanske
*Assistant Examiner* — Matthew James O'Neill
(74) *Attorney, Agent, or Firm* — ScienBiziP, P.C.

(57) ABSTRACT

A rocking arm structure includes an arm body, a first wheel assembly connected to the arm body, a second wheel assembly connected to the arm body, and a shaft assembly disposed between the first wheel assembly and the second wheel assembly. The arm body can rotate relative to the main body around the shaft assembly, and drive the first wheel assembly and the second wheel assembly to revolve in a same direction around the shaft assembly. The first wheel assembly and the second wheel assembly are both steering wheel assemblies or both directional wheel assemblies.

11 Claims, 6 Drawing Sheets

US 11,865,890 B2

ROCKING ARM STRUCTURE PROVIDING ADDITIONAL WHEEL SUPPORT AND DEVICE HAVING THE SAME

FIELD

The subject matter herein generally relates to devices, and more particularly, to a rocking arm structure with wheels and a device having the rocking arm structure.

BACKGROUND

Devices, such as robots or vehicles, may include wheels to allow the devices to move or change directions. However, in a complicated or uneven terrain, the stability of the device and of the cargo carried by the device maybe affected. Therefore, there is room for improvement in the art.

BRIEF DESCRIPTION OF THE DRAWINGS

Implementations of the present technology will now be described, by way of embodiment, with reference to the attached figures.

DETAILED DESCRIPTION

Figure 1:
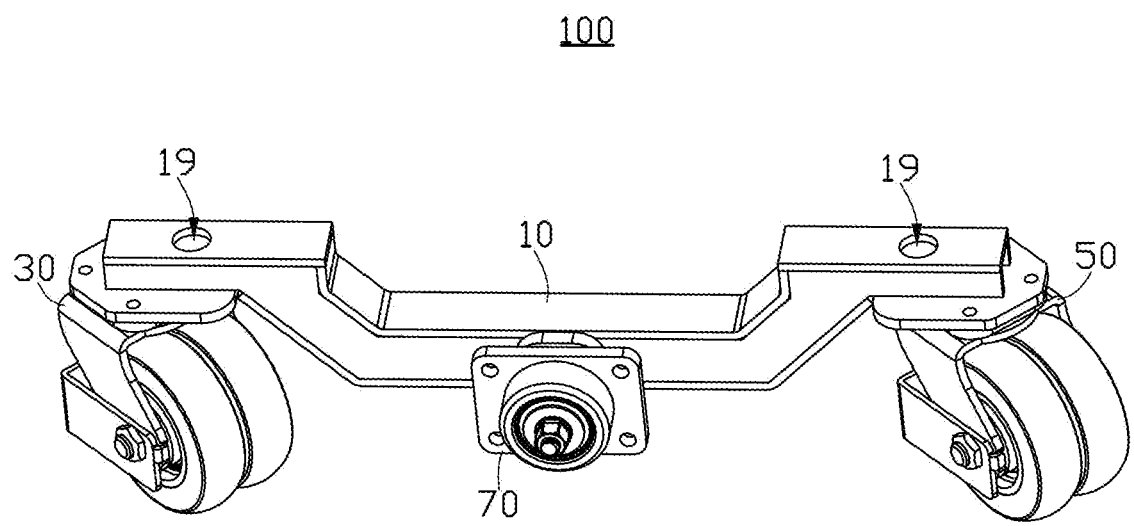
FIG. 1 is a diagrammatic view of a rocking arm structure according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
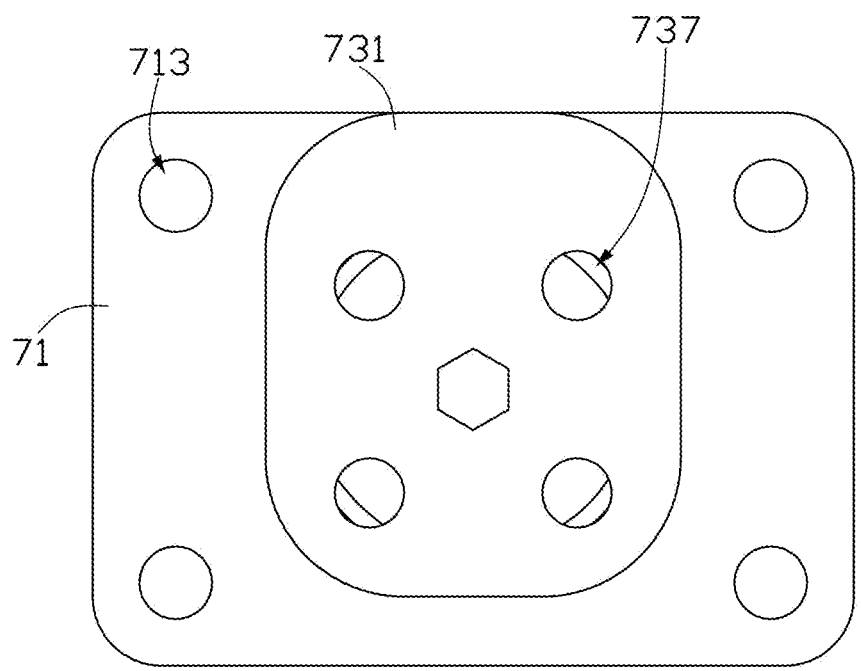
FIG. 2 is a diagrammatic view of a shaft assembly of the rocking arm structure viewed from another angle.

Referring to FIGS. 1 to 2, the present disclosure provides an embodiment of a rocking arm structure 100. The rocking arm structure 100 includes an arm body 10, a first wheel assembly 30, a second wheel assembly 50, and a shaft assembly 70. Each of the first wheel assembly 30 and the second wheel assembly 50 are connected to the arm body 10. The shaft assembly 70 is disposed between the first wheel assembly 30 and the second wheel assembly 50. A distance between the shaft assembly 70 and the first wheel assembly 30 may be equal to a distance between the shaft assembly 70 and the second wheel assembly 50. The shaft assembly 70 is used to connect the rocking arm structure 100 to a main body 20 (shown in FIG. 6). In the case of a 4-wheel robot or vehicle, a pair of rocking arm structures 100 can be fitted, that is, a rocking arm structure 100 can be fitted to the main body 20 on two opposite ends.

When in use, the arm body 10 can rotate relative to the main body 20 around the shaft assembly 70 to suit a change of terrain, such as one causing sudden pitching of a device. Thus, the arm body 10 drives the first wheel assembly 30 and the second wheel assembly 50 to revolve in a same direction (clockwise or counterclockwise) around the shaft assembly 70, allowing the rocking arm structure 100 to adapt and reduce fore-and-aft pitching and maintain contact with the ground. Thus, the stability of the robot or vehicle is improved. A sensor for detecting the change of terrain is not needed in the rocking arm structure 100, so that the structure of the rocking arm structure 100 is simplified. In at least one embodiment, each of the first wheel assembly 30 and the second wheel assembly 50 is a steering wheel assembly. As such, the castor angle of the first wheel assembly 30 or the second wheel assembly 50 itself allows self-steering according to the change of terrain. Thus, the adaptability of the rocking arm structure 100 to the terrain is improved. In another embodiment, each of the first wheel assembly 30 and the second wheel assembly 50 is a directional wheel assembly.

Figure 3:
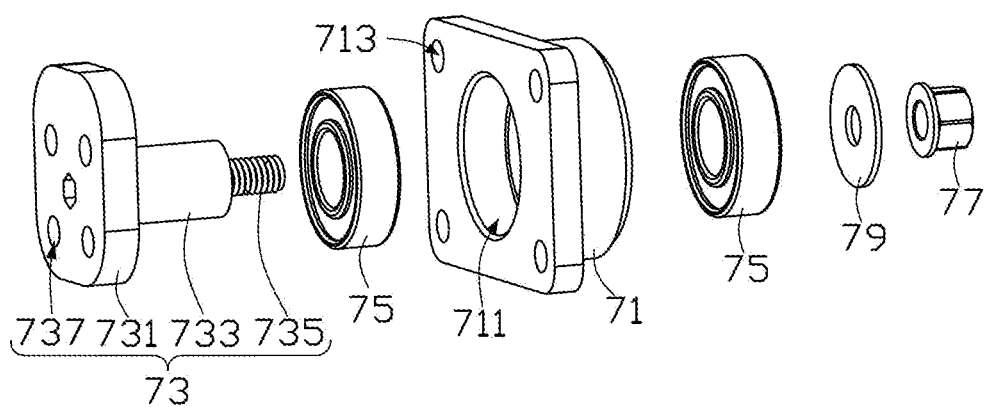
FIG. 3 is an explode view of the shaft assembly of FIG. 2.
Figure 4:
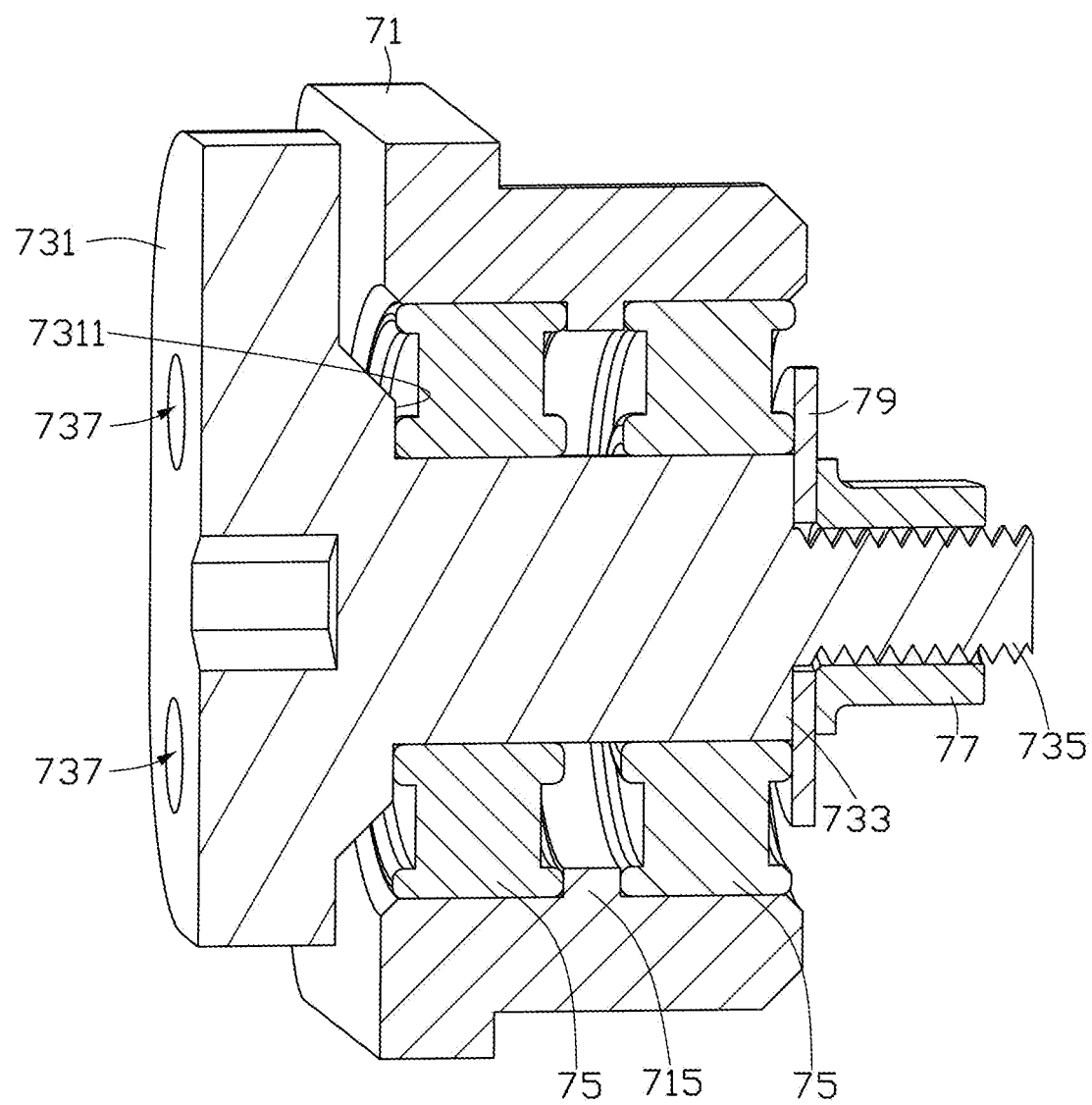
FIG. 4 is a cross-sectional view of the shaft assembly of FIG. 2.

In at least one embodiment, referring to FIGS. 2 to 4, the shaft assembly 70 includes a connecting seat 71, a shaft 73, at least one bearing 75, and a first fastener 77. The connecting seat 75 is used to connect the main body 20 (shown in FIG. 6). The connecting seat 71 defines a through hole 711, and the at least one bearing 75 is disposed in the through hole 711. The shaft 73 is rotatably disposed in the at least one bearing 75, and the bearing 77 provides smoothness and precision in movement and long service life. Since the shaft 73 can rotate in the at least one bearing 75, the first wheel assembly 30 and the second wheel assembly 50 can revolve in the same direction around the shaft 73.

In at least one embodiment, the shaft 73 includes a first shaft portion 731 and a second shaft portion 733 connected to the first shaft portion 731. An end face 7311 of the first shaft portion 731 facing the second shaft portion 733 is abutted against the bearing 75. The second shaft portion 733 includes a fastening portion 735 extending out of the bearing 75. The fastening portion 735 is connected to the first fastener 77, thereby limiting the position of the bearing 75. The shaft 73 is connected to the arm body 10, and the connecting seat 71 is connected to the main body 20. The rotation of the shaft 73 causes the first wheel assembly 30 and the second wheel assembly 50 to rotate in the same direction around the shaft 73. In at least one embodiment, the fastening portion 735 may be a threaded stud, and the first fastener 77 may be a nut.

In this embodiment, referring to FIG. 3 and FIG. 4, the shaft assembly 70 includes two bearings 75. A flange 715 protrudes from an inner wall of the through hole 711. The flange 715 is disposed between and abuts against the two bearings 75. In at least one embodiment, referring to FIG. 3, the shaft assembly 70 further includes a gasket 79. The gasket 79 is disposed between the first fastener 77 and one of the at least one bearing 75 adjacent to the first fastener 77.

In at least one embodiment, the first shaft portion 713 defines a first mounting hole 737 at another end surface away from the second shaft portion 733. The arm body 10 defines a second mounting hole 17. The rocking arm structure 100 further includes a second fastener (such as a screw bolt, not shown), which passes through the first mounting hole 737 and the second mounting hole 17 to connect the arm body 10 and the shaft assembly 70 together. Referring to FIGS. 2, and 3, the connecting seat 71 further defines a third mounting hole 713. The maim body 20 further defines a fourth mounting hole (not shown). The rocking arm structure 100 further includes a third fastener (such as a screw bolt, not shown), which passes through the third mounting hole 713 and the fourth mounting hole to connect the connecting seat 71 and the main body 20 together.

Figure 5:
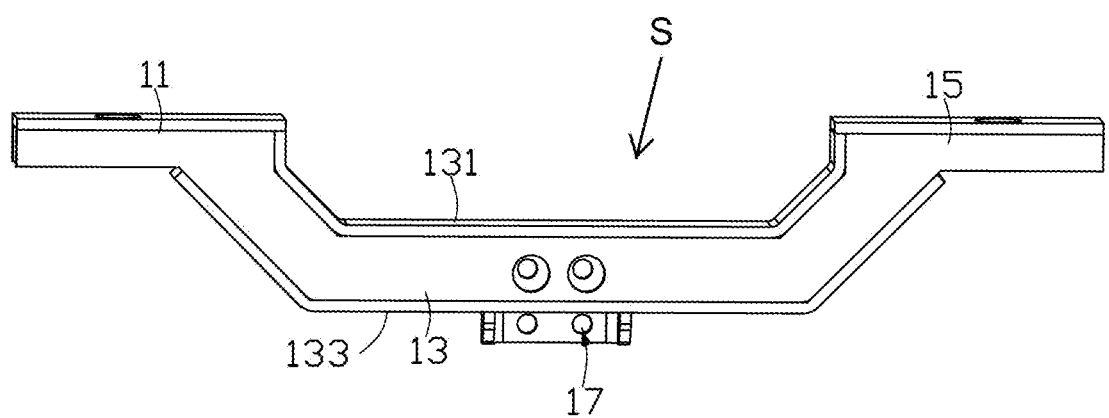
FIG. 5 is a diagrammatic view of an arm body of the rocking arm structure of FIG. 1.

In at least one embodiment, referring to FIG. 5, the arm body 10 includes a first arm portion 11, a second arm portion 13, and a third arm portion 15. The second arm portion 13 is connected between the first arm portion 11 and the third arm portion 15. The first arm portion 11 and the third arm portion 15 are spaced from and aligned with each other. The second arm portion 13 includes a first end face 131 and a second end face 133 opposite to the first end face 131. The first end face 131 is disposed between the second end face 133 and the first arm portion 11 or the third arm portion 15. The first end face 131 is recessed to form a receiving space S. When the rocking arm structure 100 is mounted into the device 200, electronic elements or auxiliary elements of the device 200 can be received in the receiving space S.

In at least one embodiment, referring to FIG. 1, each of the first arm portion 11 and the third arm portion 15 defines a fifth mounting hole 19. The first wheel assembly 30 and the second wheel assembly 50 can be mounted to the arm body 10 at the fifth mounting holes 19.

Figure 6:
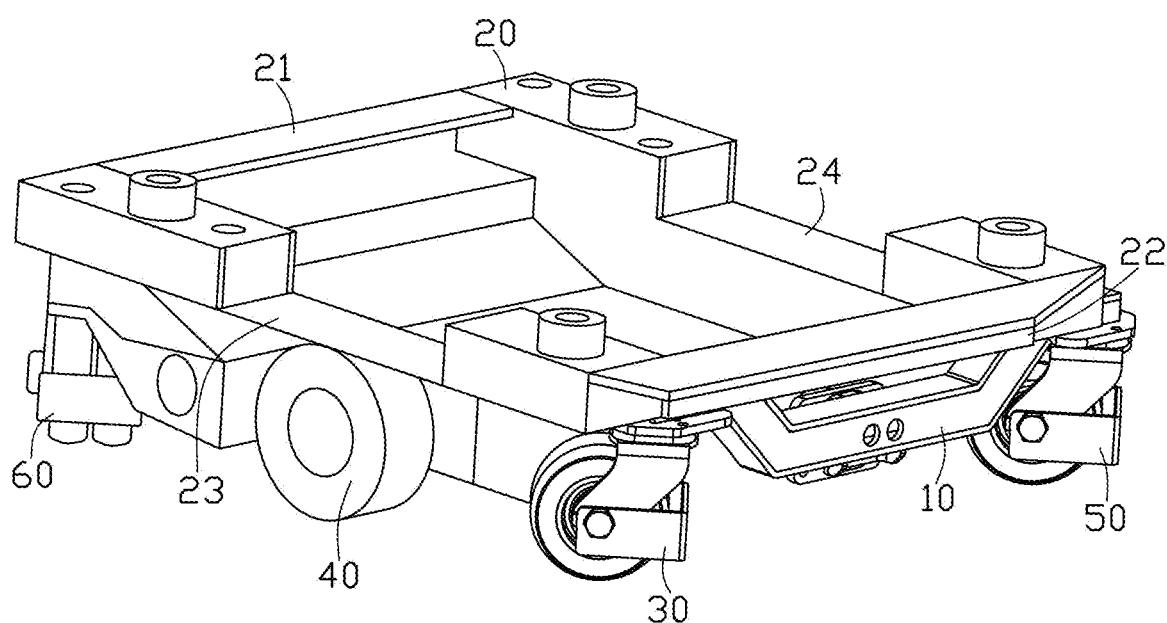
FIG. 6 is a diagrammatic view of a device according to an embodiment of the present disclosure.

Referring to FIG. 6, the present disclosure also provides an embodiment of a device 200. The device 200 may be a self-powered device such as a vehicle. In another embodiment, the device 200 may also be a robot. The device 200 includes a main body 20 and at least one of the above-mentioned rocking arm structure 100. The at least one rocking arm structure 100 is connected to the main body 20 through the shaft assembly 70.

In at least one embodiment, the device 200 includes two rocking arm structures 100. The main body 20 includes a front end 21, a rear end 22, a first side 23, and a second side 24. The front end 21 and the rear end 22 are opposite to each other. The first side 23 and the second side 24 are opposite to each other. Each of the first side 23 and the second side 24 is connected between the front end 21 and the rear end 22. The two rocking arm structure 100 are mounted at the front end 21 and the rear end 22.

In at least one embodiment, the device 200 may also include other two directional wheel assemblies 40 mounted at the first side 23 and the fourth side 24. The device 200 may also include other two steering wheel assemblies 60 mounted at the front end 21.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A rocking arm structure comprising:
   an arm body;
   a first wheel assembly connected to the arm body;
   a second wheel assembly connected to the arm body; and
   a shaft assembly disposed between the first wheel assembly and the second wheel assembly;
   wherein the arm body is configured to rotate relative to a main body around the shaft assembly, and to drive the first wheel assembly and the second wheel assembly to revolve in a same direction around the shaft assembly; the first and the second wheel assemblies are both steering wheel assemblies or the first and the second wheel assemblies are both directional wheel assemblies;
   wherein the shaft assembly comprises a connecting seat, a shaft, two bearings, and a first fastener, the connecting seat defines a through hole, the two bearings are disposed in the through hole, the shaft is rotatably disposed in the two bearings and connected to the arm body, the first fastener is connected to the shaft;
   wherein the shaft comprises a first shaft portion and a second shaft portion connected to the first shaft portion, an end face of the first shaft portion facing the second shaft portion is abutted against one of the two bearings, the second shaft portion comprises a fastening portion extending out of the two bearings, the fastening portion is connected to the first fastener;
   wherein a flange protrudes from an inner wall of the through hole, and the flange is disposed between and abuts against the two bearings.

2. The rocking arm structure according to claim 1, wherein the first wheel assembly and the second wheel assembly are both steering wheel assemblies.

3. The rocking arm structure according to claim 1, wherein the shaft assembly further comprises a gasket disposed between the first fastener and one of the two bearings adjacent to the first fastener.

4. The rocking arm structure according to claim 1, wherein the arm body comprises a first arm portion, a second arm portion, and a third arm portion, the first, the second, and the third arm portions are successively connected to each other, the second arm portion comprises a first end face, the first end face is recessed to form a receiving space.

5. The rocking arm structure according to claim 1, wherein a distance between the first wheel assembly and the shaft assembly is equal to a distance between the second wheel assembly and the shaft assembly.

6. A device comprising:
   a main body; and
   at least one rocking arm structure each comprising:
      an arm body;
      a first wheel assembly connected to the arm body;
      a second wheel assembly connected to the arm body; and
      a shaft assembly disposed between the first wheel assembly and the second wheel assembly, the at least one rocking arm structure connected to the main body through the shaft assembly;
   wherein the arm body is configured to rotate relative to the main body around the shaft assembly, and to drive the first wheel assembly and the second wheel assembly to revolve in a same direction around the shaft assembly; the first and the second wheel assemblies are both steering wheel assemblies or the first and the second wheel assemblies are both directional wheel assemblies;
   wherein the shaft assembly comprises a connecting seat, a shaft, two bearings, and a first fastener, the connecting seat defines a through hole, the two bearings are disposed in the through hole, the shaft is rotatably disposed in the two bearings and connected to the arm body, the first fastener is connected to the shaft;

wherein the shaft comprises a first shaft portion and a second shaft portion connected to the first shaft portion, an end face of the first shaft portion facing the second shaft portion is abutted against one of the two bearings, the second shaft portion comprises a fastening portion extending out of the two bearings, the fastening portion is connected to the first fastener;

wherein a flange protrudes from an inner wall of the through hole, and the flange is disposed between and abuts against the two bearings.

7. The device according to claim 6, wherein the main body comprises a front end and a rear end opposite to the front end, the at least one rocking arm structure comprises two rocking arm structures, the two rocking arm structures are mounted to the front end and the rear end.

8. The device according to claim 6, wherein the first wheel assembly and the second wheel assembly are both steering wheel assemblies.

9. The device according to claim 6, wherein the shaft assembly further comprises a gasket disposed between the first fastener and one of the two bearings adjacent to the first fastener.

10. The device according to claim 6, wherein the arm body comprises a first arm portion, a second arm portion, and a third arm portion successively connected, the second arm portion comprises a first end face, the first end face is recessed to form a receiving space.

11. The device according to claim 6, wherein a distance between the first wheel assembly and the shaft assembly is equal to a distance between the second wheel assembly and the shaft assembly.

* * * * *